No. 781,453. PATENTED JAN. 31, 1905.
T. O. ORGAN.
FEED WATER HEATER AND PURIFIER.
APPLICATION FILED DEC. 4, 1903.

6 SHEETS—SHEET 1.

WITNESSES:
H. Walker
Mac B. Owens.

INVENTOR
Thomas O. Organ
BY Munn
ATTORNEYS

No. 781,453. PATENTED JAN. 31, 1905.
T. O. ORGAN.
FEED WATER HEATER AND PURIFIER.
APPLICATION FILED DEC. 4, 1903.

6 SHEETS—SHEET 2.

WITNESSES:
H. Walker
Isaac B. Owens.

INVENTOR
Thomas O. Organ
BY
ATTORNEYS

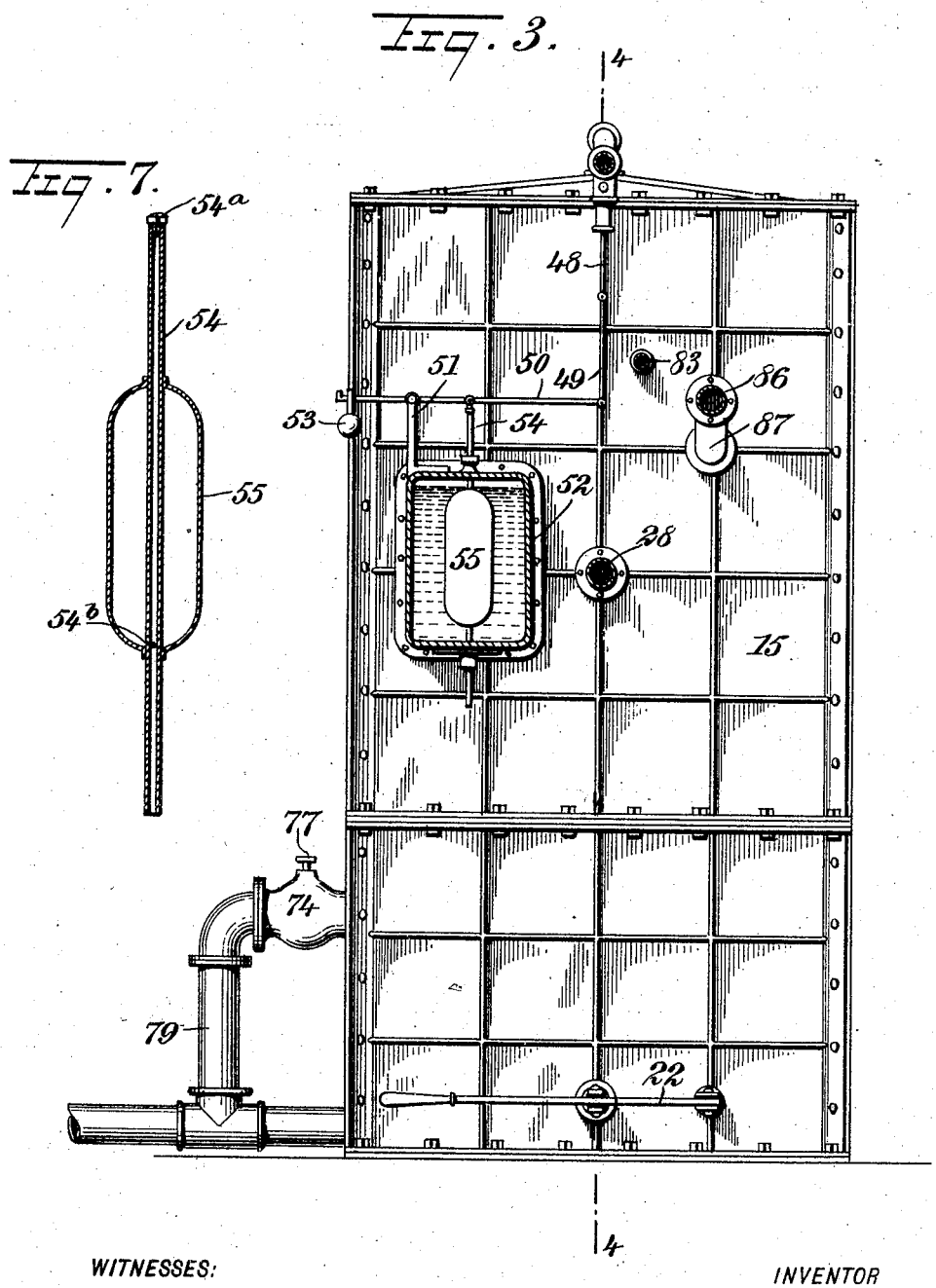

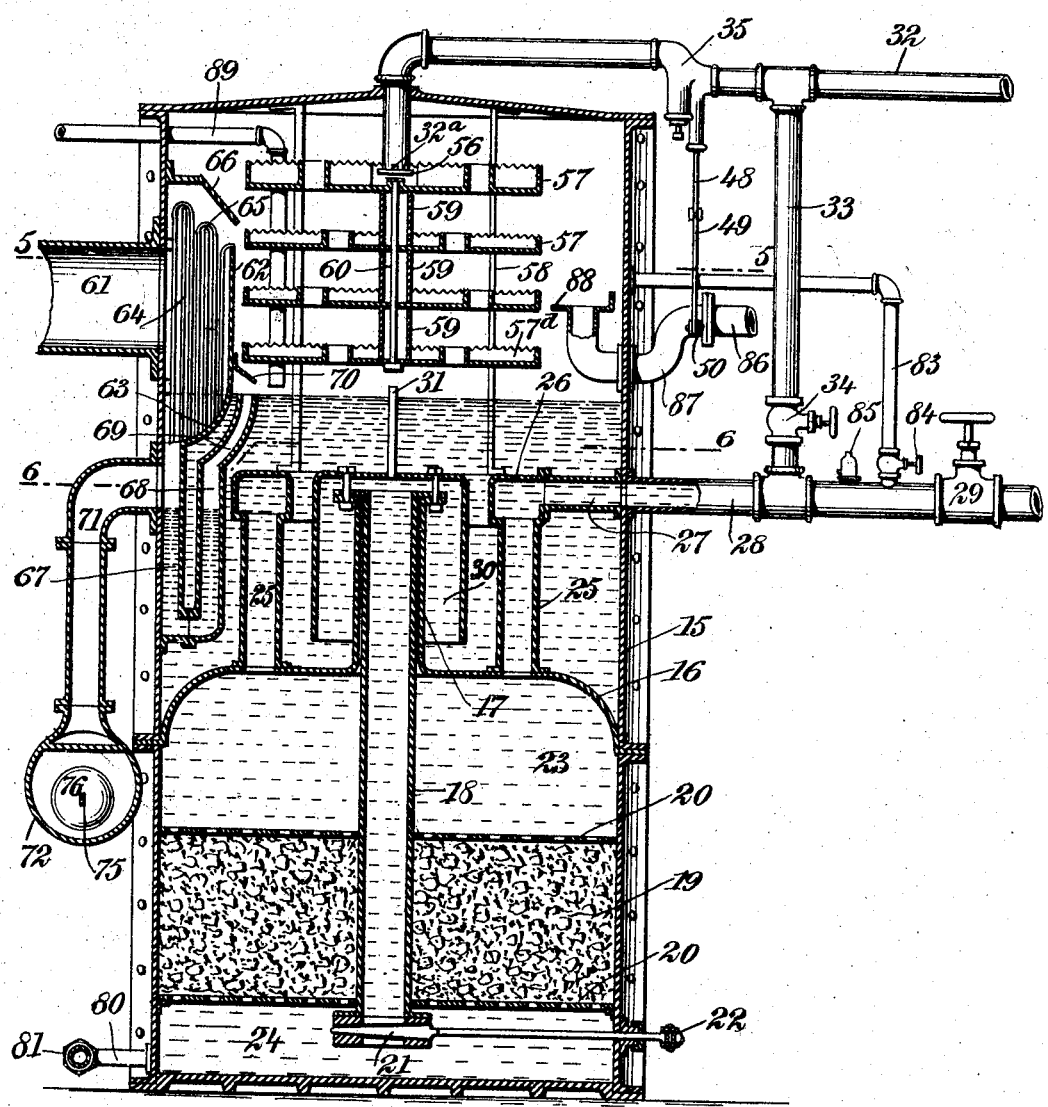

No. 781,453. PATENTED JAN. 31, 1905.
T. O. ORGAN.
FEED WATER HEATER AND PURIFIER.
APPLICATION FILED DEC. 4, 1903.
6 SHEETS—SHEET 5.
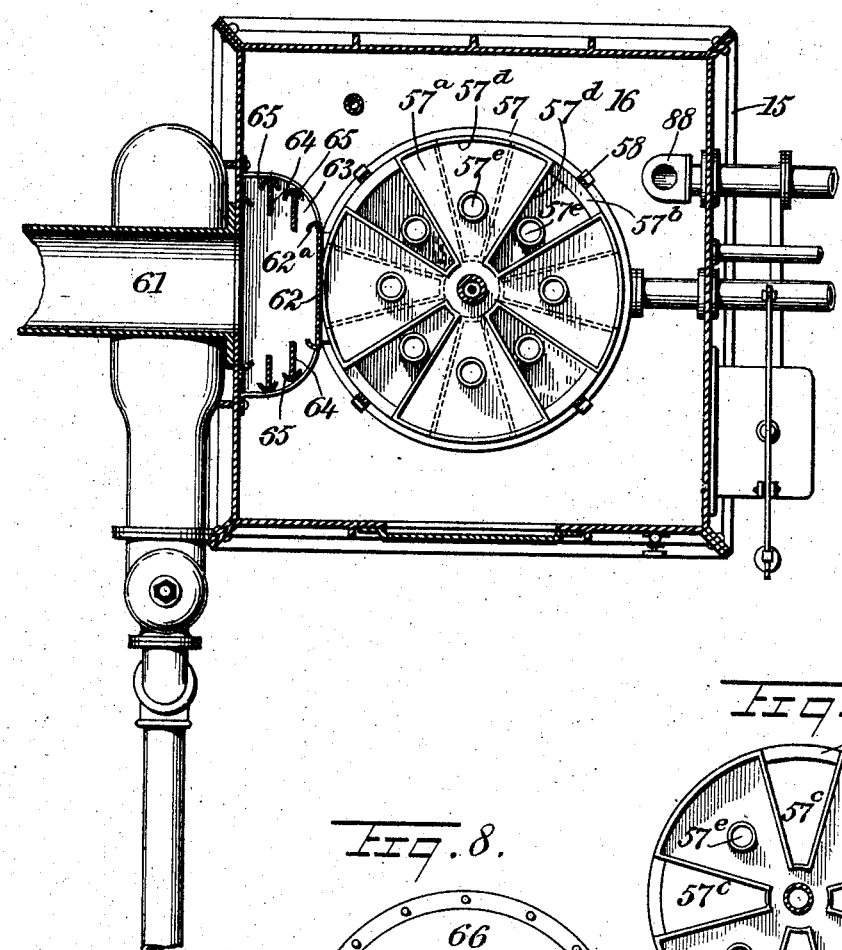
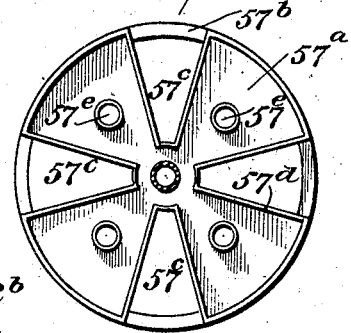
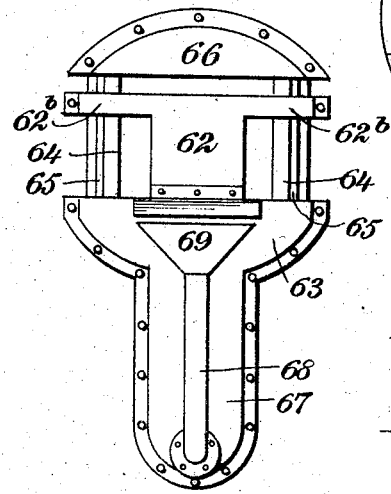
WITNESSES:
H. Walker
Isaac B. Owens.
INVENTOR
Thomas O. Organ
BY
ATTORNEYS No. 781,453. PATENTED JAN. 31, 1905.
T. O. ORGAN.
FEED WATER HEATER AND PURIFIER.
APPLICATION FILED DEC. 4, 1903.
6 SHEETS—SHEET 6.
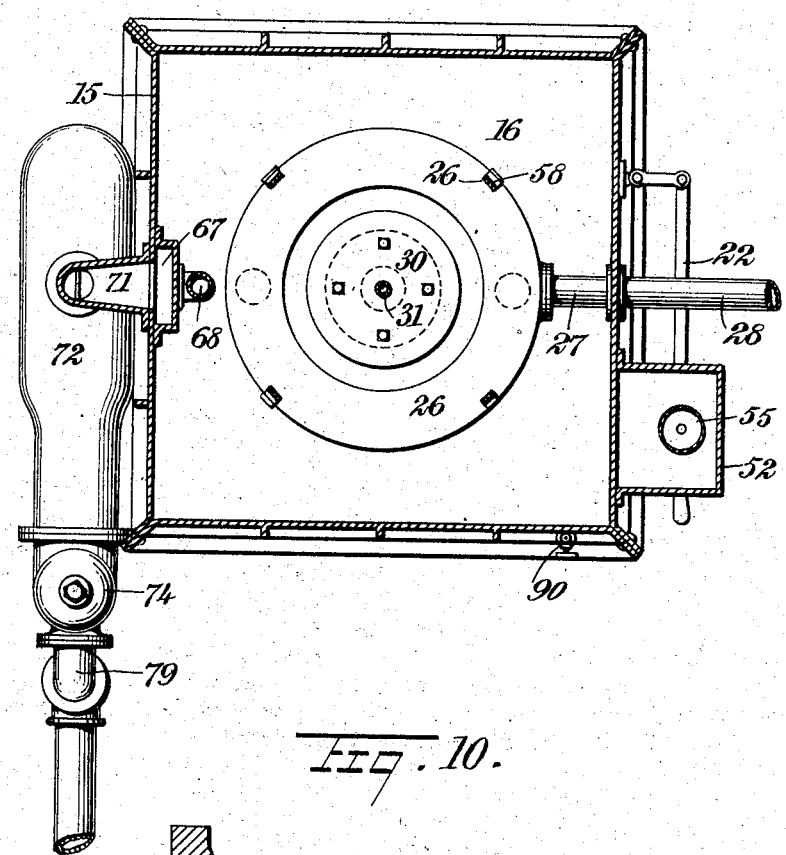
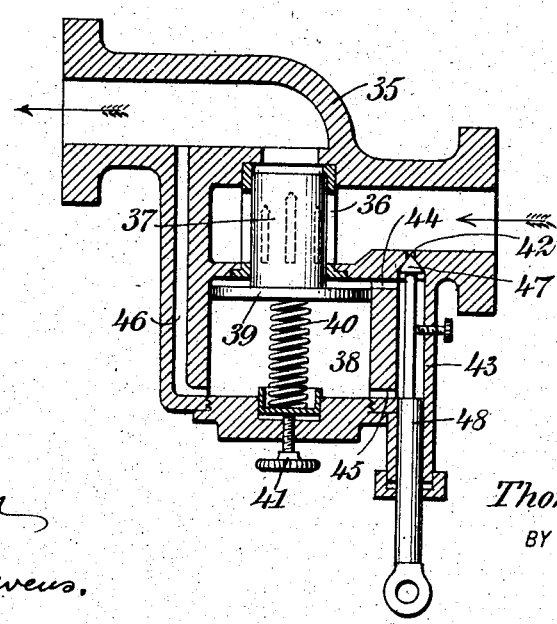
WITNESSES:
H. Walker
Chase B. Owens.
INVENTOR
Thomas O. Organ
BY
ATTORNEYS No. 781,453. Patented January 31, 1905.

UNITED STATES PATENT OFFICE.

THOMAS OPIE ORGAN, OF PHILADELPHIA, PENNSYLVANIA.

FEED-WATER HEATER AND PURIFIER.

SPECIFICATION forming part of Letters Patent No. 781,453, dated January 31, 1905.

Application filed December 4, 1903. Serial No. 183,741.

*To all whom it may concern:*

Be it known that I, THOMAS OPIE ORGAN, a citizen of the United States, and a resident of Philadelphia, in the county of Philadelphia and State of Pennsylvania, have invented a new and Improved Feed-Water Heater and Purifier, of which the following is a full, clear, and exact description.

This invention relates to an apparatus for heating boiler feed-water by the aid of exhaust-steam, for filtering the feed-water, extracting the oil from the exhaust-steam, and also for receiving the drip from the heating system.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
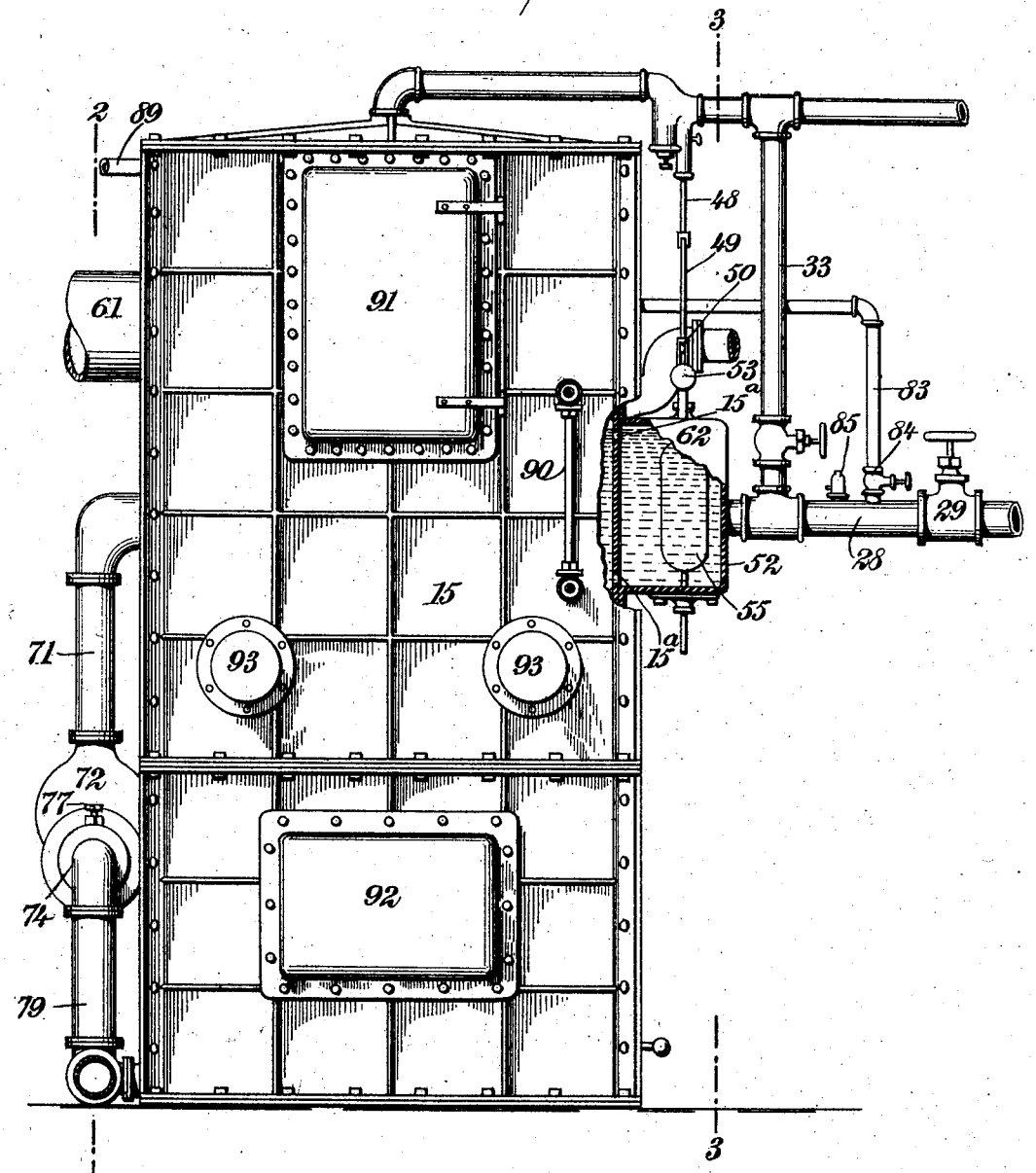
Figure 2:
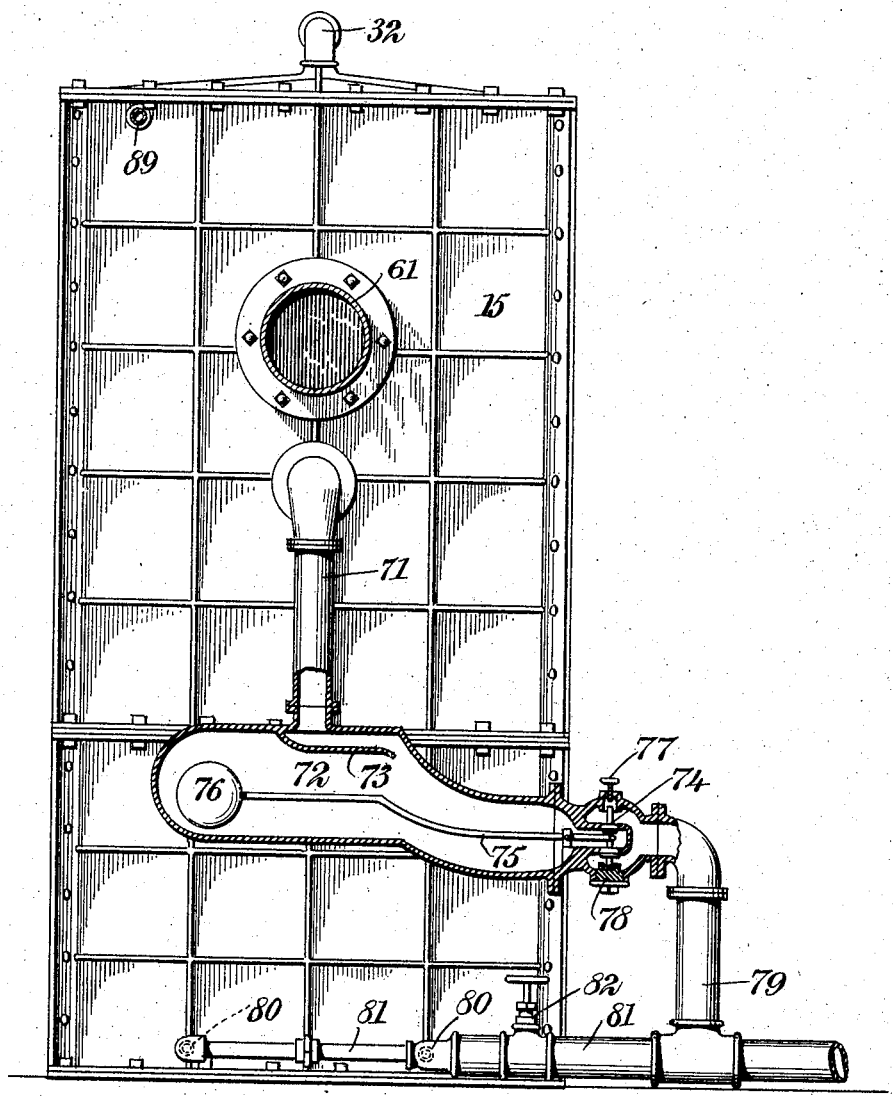

Figure 1 is a front elevation of the apparatus, parts being broken away and in section. Fig. 2 is a left side elevation with parts in section on the line 2 2 of Fig. 1. Fig. 3 is a right side elevation with parts in section on the line 3 3 of Fig. 1. Fig. 4 is a central vertical section of the invention on the line 4 4 of Fig. 3. Fig. 5 is a horizontal section on the line 5 5 of Fig. 4. Fig. 6 is a horizontal section on the line 6 6 of Fig. 4. Fig. 7 is a detail section of the float for controlling the water-supply. Fig. 8 is an inner side elevation of the oil-collector and the intake-limb of the water-overflow trap. Fig. 9 is a plan view of one of the water-trays, and Fig. 10 is an enlarged section of the water-inlet valve.

The apparatus comprises an exterior shell 15, which is here shown as square in cross-section and which may be formed of any suitable material—for example, sheet metal riveted together, as shown. Within the shell 15 at the lower portion thereof is a horizontally-extending partition 16, here shown as arched upward and having a centrally-located pipe 17 passing upward therefrom. Extending through the pipe 17 is a water-downtake pipe 18, which passes below the partition 16 to a point near the bottom of the shell 15.

19 indicates a mass of filtering material held between two perforate walls 20, and through this filter the tube 18 passes.

21 indicates a gate which commands the lower end of the tube 18, and 22 indicates a suitable means for operating said gate, this means extending to the outside of the shell, as will be understood.

The partition 16 is spaced from the filter and forms thereby a filtered-water chamber 23, while the filter is spaced from the bottom of the shell and forms thereby a settling-chamber 24. Uptake-pipes 25 pass from the filtered-water chamber 23 upward to an annular pipe-header 26, and from this header or manifold 26 a connection 27 extends to the side of the shell 15. Said connection communicates with the feed-water suction-pipe 28, which passes to the boiler and is commanded by a valve 29. A hood 30 is mounted on the upper end of the tube 17 and extends down around the sides of the same to form a water seal at the upper end of the downtake-pipe 18.

31 indicates a vent-pipe passing from the interior of the hood 30 upward to a point above the maximum water-line, so as to vent the interior of the hood 30 as the water rises therein.

32 indicates the water-supply pipe, which has a filter-blow-out branch 33 passing down to the pipe 28 and provided with a valve 34, as shown. Inward from the branch 33 the pipe 32 has interposed between two of its sections a valve for controlling the water-flow, 35 indicating the casing of said valve. The valve is shown in detail in Fig. 10 and comprises a cylindrical cage 36, located in the case 35 and receiving a sliding plug 37. Below the plug 37 is a chamber 38, formed in the case 35, and in this chamber a piston 39 is located.

40 indicates a spring tending to hold the plug 37 and piston 39 in their uppermost position, during which the valve is closed, and 41 indicates a suitable means for adjusting the tension of said spring.

Extending from the main passage in the case 35 is a port 42, which leads to an elongated chamber 43, extending alongside of the chamber 38. From the upper part of the chamber 43 a port 44 extends, and 45 indicates a port extending from the lower part of the chamber 43, both of these ports communicating with the chamber 38. A port 46 extends from the chamber 38 back into the main passage of the case 35 at the side of the plug 37 and cage 36 opposite the side on which the port 42 is located. Operating in the chamber 43 is an auxiliary valve 47, which when in its uppermost position closes the port 42 and which when moved downward closes communication between the end portions of the chamber 43. When the parts are in the position shown in Fig. 10, the spring 40 holds the plug 37 in active position, thus keeping the valve closed. When the auxiliary valve 47 moves downward into the chamber 43, it opens the port 42, and in this way water may pass from the main passage through the port 42, the upper end of the chamber 43, and through the port 44 into the upper part of the chamber 38; but the auxiliary valve 47 will cut off the port 45. The result of this operation is that the water entering through the port 44 and bearing on the upper side of the piston 39 will move said piston downward, which piston carries with it the plug 37, and in this way a free passage through the water-valve is provided. When the valve 47 is closed, the spring 40 returns the plug 37 to the position shown in Fig. 10, and as the piston 39 moves upward the water from the upper side of the piston is forced out through the passages 44, 43, 45, and 46. Said auxiliary valve 47 has a stem 48 projecting downward from the case 35 and connected by a link 49 (see Fig. 3) with a lever 50. Said lever is fulcrumed on a stud 51, rising from a float-box 52, this box being attached to the right-hand side of the shell 15. 53 indicates a weight attached to the opposite end of the lever 50, and 54 indicates a float-rod which is connected with this lever at the side of the fulcrum opposite that on which the weight is located. The float-rod 54 extends into the box 52 and is there connected with the float 55. The rod 54, as shown in Fig. 7, is hollow. Its upper end is fitted with a plug 54$^a$, and said rod extends continuously through the float 55 and projects downward through the box 52, where the lower end of the rod is open. Said rod 54 is formed with an orifice or orifices 54$^b$, located within the lower extremity of the float 55. By this construction any liquid that may sweat through the float will be drawn off and automatically discharged. The shell 15 is formed with orifices 15$^a$, communicating, respectively, with the upper end and lower portions of the box 52, (see Fig. 1,) these orifices serving to fill the box 52 and to equalize the pressures within the box or tank 52, so as to avoid interfering with the regular action of the float. It will be seen that as the level of the water rises and falls within the shell 15 and box 52 the float 55 will respond to these changes and automatically operate the water-inlet valve, and in this manner the water is kept at the predetermined level.

The water-supply pipe 32 leads into the top of the shell 15 at the center thereof and projects downward therefrom, the extremity of the pipe being formed with notches 32$^a$, and at the end of the pipe a baffle-plate 56 is located, (see Fig. 4,) this baffle-plate serving to cause the water to pass out horizontally from the supply-pipe 32. Below the discharge end of the pipe 32 are a number of trays 57. These trays are preferably four in number and arranged one above the other, they being supported by rods 58 passing from the pipe-header 26 to the top of the shell. Between the trays thimbles 59 are interposed to hold the trays spaced apart, and 60 indicates a tie-rod extending through the trays and thimbles, as shown. Each tray, as shown in Figs. 4, 5, and 9, is formed of a bottom 57$^a$, strengthened by an annular band 57$^b$ and having segmental openings 57$^c$ formed therein. Around the edges of the bottom 57$^a$ vertical flanges 57$^d$ extend. This gives each tray essentially the form of a Maltese cross. The said trays are arranged with the openings 57$^c$ out of vertical alinement, so that the water overflowing from the sides of one tray falls into the water-spaces of the other tray, and thus the water falls in thin sheets from one tray to the other. Extending through each water-compartment of each tray is a tube 57$^e$, these tubes surrounding openings in the bottoms of the trays and forming steam-passages and also forming water-overflow passages. The edges of the flanges 57$^d$ are preferably serrated, as shown best in Fig. 4, but this is not regarded as essential.

61 indicates the steam-inlet pipe, which passes into the upper portion of the shell 15 at one side of the trays 57. Within the shell 15 at the discharge end of the pipe 61 is an oil separator or extractor which comprises a plate 62, placed directly opposite the end of the steam-pipe and fastened to the oil-funnel 63 and to the sides of the shell by means of brackets 62$^b$. (See Fig. 8.) Said plate 62 has its edges turned inward to form flanges 62$^a$, (see Fig. 5,) which prevent the oil from running over the vertical edges of the plate to cause the oil to pass down into the oil-collecting funnel 63. Attached to the funnel 63 at each side of the plate 62 are additional oil-collector plates 64, which extend vertically in planes parallel to the plane of the plate 62. Said oil-collecting plates 64 have T-shaped flanges 65 at their outer edges, which serve, as the flanges 62$^a$, to prevent the oil from running off of the outer edges of the collecting-plates. All of said collecting-plates lead down to the oil-collecting funnel 63. Said plates are formed with smooth surfaces, which enable the oil to flow readily, and as the steam enters the shell it contacts with the oil-collecting plates, and in this manner the oil is separated from the steam, which latter passes through the spaces between the several plates and pervades the upper portion of the shell, as will be understood.

66 indicates an apron overhanging the oil-collector.

The funnel 63 discharges into the uptake branch 67 of a water seal, the downtake branch 68 of which communicates with the lower end of the uptake branch and has at its upper end a funnel 69. (See Figs. 4 and 8.) Over said funnel is located an apron 70. This funnel 69 has its upper end lying at the predetermined maximum water-level, and when the water rises above this level it flows into the funnel 69 and thence into the trap. From the upper end of the uptake branch 67 of the trap a pipe 71 passes, this pipe lying outside of the shell 15 and discharging into a tank 72. Under the lower end of the pipe 71 a deflector 73 is located within the tank 72. Said tank has a balanced valve 74 commanding the outlet therefrom, and said valve is actuated by a rod 75 and float 76, located within the tank 72.

77 indicates a thumb-screw for opening the valve 74 to blow through the tank and also to keep the valve unseated should the float become water-logged and refuse to unseat the valve 74, and 78 indicates a plug in the valve-casing for enabling the valve to be seated and adjusted.

From the valve 74 a discharge-pipe 79 passes to the hot-well, sewer, or other place where the overflow is to be conducted. From the lower settling-chamber 24 two blow-off tubes 80 pass to a pipe 81, which in turn leads to the pipe 79.

82 indicates a valve for controlling the pipe 81.

The suction-pipe 28 is provided with a vent-pipe 83, which extends upward from the pipe 28 and into the shell 15, said pipe having a valve 84, as shown.

85 indicates a relief-valve which is placed in the pipe 28 between the pipe 83 and the blow-out pipe 33. This valve prevents excessive pressure in the suction-pipe when blowing out the filter.

A pipe 86, carrying the drip or condensate from the steam-heating system, passes to a trap 87, which is placed in the walls of the shell 15, said trap discharging into the shell and having a horizontal sheet 88 located at its discharge end to spread the water out into a thin sheet as it is discharged, thus enabling this water readily and quickly to acquire the temperature of the water within the shell and preventing hammering due to difference in temperatures.

86 indicates an air-vent pipe which passes from a point slightly above the normal water level within the shell 15 upward and outward into the atmosphere, this pipe being designed to carry off excess air from within the shell, the steam rising to the upper part of the shell and the air, being heavier, dropping to the water-surface.

90 indicates a water-gage for indicating the height of water within the shell 15. (See Fig. 1.) The front of the shell is provided with a door 91 to enable access to be had to the upper interior of the shell and with a door 92 to enable access to be had to the filter.

93 indicates manholes for reaching the interior of other portions of the apparatus.

In the operation of the invention the float 55 dropping will open the valve 35 and allow the water to flow through the pipe 32 until it reaches the predetermined level within the shell 15, whereupon the float closes the water-valve. The water flows into the trays and overflows in the manner described, producing a great number of very thin sheets of falling water. The steam entering through the pipe 61 passes through these films of water, and a more effective condensation takes place. The oil from the steam is collected and falls into the funnel 63 and trap-limb 67. The hood 30 forms a water seal at the upper end of the pipe 18 and renders it impossible for any filtering material to enter the pipe, so that should any oil escape the oil-collecting devices or return with the water from the heating system it will float on the surface of the water above the partition 16 and be carried off through the traps 67 68. The chamber above the partition 16 forms the first settling-chamber, and any impurities in the water may be precipitated to the partition 16. The water will then pass into the hood 30 and through the pipe 18 to the lower settling-chamber 24, the valve 21 being normally open. From the chamber 24 the water will pass up through the filter into the filtered-water chamber 23, after which the purified water passes through the pipes 25 and the pipe-header 26 to the suction-pipe 28, which carries the water off to the boiler or other point of consumption. The drip from the heating system passing in through the pipe 86 mingles with the water in the first settling-chamber above the partition 16 and goes through the above-described operation as a part thereof.

In order to blow off or clean the filter, the gate or valve 21 should be closed as well as the valves 29 and 84. The valves 34 and 82 should be opened, so as to allow the water from the supply-pipe 32 to run backward through the pipes 25 and through the filter and thence out through the pipes 80 and 81. It will be seen, therefore, that the gate 21 is closed only during the blowing-out operation, and it will be observed also that this blowing-out operation affects in no manner the parts in the upper portion of the filter.

In connection with this invention it will be observed that it provides for a maximum condensation of the exhaust-steam and a high temperature of the feed-water, due to the peculiar trays 57 and the manner in which the steam is brought into intimate association with the water flowing therefrom. It will also be seen that two distinct settling-chambers are provided, one in the space above the partition 16 and the other in the space between the bottom of the shell and the filter. The upper settling-chamber receives any oil that may possibly pass the oil-collecting device, any oil that may return with the water of condensation through the trap 87, and any floating substance that might pass into the heater with the water. The oil and floating substances will be carried off by the trap 67 68, and owing to the hood 30 and the water seal formed thereby nothing but the water is allowed to pass into the downtake-pipe 18. The water receives its final settling in the chamber 24 before passing through the filter into the filtered-water chamber 23. By arranging the filter as in this apparatus a relatively large filtering-surface is secured, thus more effectively removing the impurities from the water. The chamber 23 is made large enough to store a considerable volume of water, so that a reserve is always on hand and may at all times be drawn out through the tube 28, notwithstanding that the water may be considerably below its normal level in the settling-chamber 16, and owing to this chamber and to the manifold tubes 25 and header 26, through which the water must pass from the chamber to the boiler, a means is provided for the reheating of the water, since said manifold tubes and header are submerged in the heated water above the partition 16, and, finally, it will be observed that an effective means is provided for washing or blowing out the filter and bottom settling-chamber 24 without in any way interfering with the other parts of the apparatus.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a shell or casing, a water-pipe passing into the same and having notches in its discharge end, and a tray having a plurality of water-compartments, placed respectively opposite the notches.

2. In a feed-water heater and purifier, the combination with a shell or casing, of a water-distributing tray comprising a bottom with radial openings therein, and vertical flanges extending around the edges of the bottom.

3. In a feed-water heater and purifier, the combination with a shell or casing, of a water-distributing tray comprising a bottom with radial openings therein, and vertical flanges extending around the edges of the bottom, the bottom of the tray also having openings intermediate the radial openings and flanges surrounding the intermediate openings.

4. In a feed-water heater and purifier, the combination with the casing or shell, of a plurality of superimposed water-distributing trays, each tray having radial openings therein and said openings being out of vertical alinement, for the purpose specified.

5. A feed-water heater and purifier, comprising the combination of a shell or casing, a horizontally-extending partition therein, the shell having a water-inlet above the partition, a filter below the partition, and means constituting a water-passage from the upper side of the partition to the filter, said means including a water seal.

6. A feed-water heater and purifier, comprising the combination of a shell or casing, a horizontally-extending partition therein, the shell having a water-inlet above the partition, a filter below the partition, and means constituting a water-passage from the upper side of the partition to the filter, said means including a downtake-pipe and an inverted hood placed over the upper end thereof, for the purpose specified.

7. A feed-water heater and purifier, comprising the combination of a shell or casing, a horizontally-extending partition therein, the shell having a water-inlet above the partition, a filter below the partition, means constituting a water-passage from the upper side of the partition to the filter, said means including a downtake-pipe and an inverted hood placed over the upper end thereof, for the purpose specified, and a vent-tube passing from the hood upward to a point above the normal water-level.

8. A feed-water heater and purifier, comprising the combination of a shell or casing, a horizontally-extending partition therein, the shell having a water-inlet above the partition, a filter below the partition, and means constituting a water-passage from the upper side of the partition to the filter, said means comprising a tube standing on the partition and a downtake-pipe fastened to the upper end of the tube and extending through the same.

9. A feed-water heater and purifier having a water-inlet, a partition located below the water-inlet, a filter located below the partition, means constituting a water-passage from the upper side of the partition downward to the filter, manifold tubes leading from the under side of the partition above the same, a header connected with the upper end of said tubes, and means for withdrawing the water from the header.

10. In a feed-water heater and purifier, the combination with the shell or casing having a water-inlet in its upper portion, and means for heating the water also in the upper portion of the shell, of a partition located below said heating means, a filter located below the partition and spaced from the partition and from the bottom of the shell, a downtake-tube leading from the upper side of the partition downward through the filter, an inverted hood covering the upper end of the downtake-tube for the purpose specified, the space between the filter and partition forming a filtered-water chamber and the space below the filter forming a settling-chamber, manifold pipes passing from the filtered-water chamber upward above the partition, a header connected to the manifold pipes, and means for withdrawing the water from said header.

11. In a feed-water heater and purifier, the combination with the shell or casing having a water-inlet in the upper portion thereof and means for heating the water, also in the upper portion thereof, of a partition located below the water-inlet and heater to form an upper settling-chamber, means constituting an overflow-outlet from the upper settling-chamber to a point beyond the shell or casing, a filter located below the partition and spaced from the same and from the bottom of the shell to form a bottom settling-chamber below the filter and a filtered-water chamber above the filter, means constituting a passage from the upper side of the partition downward through the filter to the lower settling-chamber, and means for withdrawing the water from the filtered-water chamber.

12. In a feed-water heater and purifier, the combination with the shell or casing having a water-inlet in the upper portion thereof and means for heating the water, also in the upper portion thereof, of a partition located below the water-inlet and heater to form an upper settling-chamber, means constituting an overflow-outlet from the upper settling-chamber, a filter located below the partition and spaced from the same and from the bottom of the shell, to form a bottom settling-chamber below the filter and a filtered-water chamber above the filter, means constituting a passage from the upper side of the partition downward through the filter to the lower settling-chamber, and means for withdrawing the water from the filtered-water chamber, said means comprising a pipe passing upward into the first settling-chamber to reheat the filtered water.

13. In a feed-water heater and purifier, the combination with the shell or casing having a water-inlet in the upper portion thereof and means for heating the water, also in the upper portion thereof, of a partition located below the water-inlet and heater to form an upper settling-chamber, means constituting an overflow-outlet from the upper settling-chamber, a filter located below the partition and spaced from the same and from the bottom of the shell, to form a bottom settling-chamber below the filter and a filtered-water chamber above the filter, means constituting a passage from the upper side of the partition downward through the filter to the lower settling-chamber, means for withdrawing the water from the filtered-water chamber, and means commanding the said passage for the water from the upper side of the partition to the bottom settling-chamber.

14. In a feed-water heater and purifier, the combination with the shell or casing having a water-inlet in the upper portion thereof and means for heating the water, also in the upper portion thereof, of a partition located below the water-inlet and heater to form an upper settling-chamber, means constituting an overflow-outlet from the upper settling-chamber, a filter located below the partition and spaced from the same and from the bottom of the shell, to form a bottom settling-chamber below the filter and a filtered-water chamber above the filter, means constituting a passage from the upper side of the partition downward through the filter to the lower settling-chamber, means for withdrawing the water from the filtered-water chamber, and means commanding the said passage for the water from the upper side of the partition to the bottom settling-chamber, said means comprising a gate and devices extending to the outside of the shell or casing whereby to operate the gate.

15. The combination of a shell or casing, a filter located therein and having a settling-chamber below it, means for leading the water to the settling-chamber, the water passing upward through the filter, means for withdrawing the filtered water from the upper side of the filter, said means for leading the water to the settling-chamber comprising a tube passing downward through the filter into the settling-chamber, and a valve device commanding the tube, for the purpose specified.

16. In a feed-water heater and purifier, the combination with the shell or casing having a water-supply pipe and means for heating the water, of a filter, means communicating therewith for drawing off the filtered water, and a connection between the water-supply pipe and said means for drawing off the filtered water, whereby to permit cleaning the filter.

17. In a feed-water heater and purifier, the combination with the shell or casing having a water-supply pipe and means for heating the water, of a filter, means communicating therewith for drawing off the filtered water, a connection between the water-supply pipe and said means for drawing off the filtered water, whereby to permit cleaning the filter, and a relief-valve in the said means for drawing off the filtered water to prevent excessive pressure in the filter during the cleaning thereof.

18. In a feed-water heater and purifier, the combination with the shell or casing having a water-inlet pipe, of a filter, a pipe for withdrawing the filtered water, a valve in said pipe, a connection between the supply-pipe and the filtered-water pipe, said connection lying between the valve and the filter, and a valve in the said connection.

19. In a feed-water heater and purifier, the combination with the shell or casing having a water-inlet pipe, of a filter, a pipe for withdrawing the filtered water, a valve in said pipe, a connection between the supply-pipe and the filtered-water pipe, said connection lying between the valve and the filter, a valve in the said connection, and a relief-valve in the filtered-water pipe, to prevent excessive pressure in the filter during the cleaning thereof.

20. A feed-water heater and purifier, comprising a shell or casing, means for leading steam to the upper portion thereof, water-purifying means in the lower portion of the casing, and a vent-pipe passing from slightly above the normal water-line in the casing outward to the atmosphere.

21. The combination of a shell or casing, a water-pipe passing into the same and having a discharge-opening, and a tray having an essentially sector-shaped water-compartment lying opposite the discharge-opening of the pipe, to receive the water therefrom.

22. In a feed-water heater and purifier, the combination of a shell or casing, a horizontally-disposed partition therein, the shell having a water-inlet above the partition, a filter below the partition and means constituting a water-passage from the upper side of the partition to the filter, said means comprising a tube standing on the partition, a downtake-pipe fastened to the upper end of the tube and extending through the same, and a hood inclosing the upper end of said tube and downtake-pipe, for the purpose specified.

23. In a feed-water heater and purifier, the combination of a shell or casing, a horizontally-disposed partition therein, the shell having a water-inlet above the partition, a filter below the partition and means constituting a water-passage from the upper side of the partition to the filter, said means comprising a tube standing on the partition, a downtake-pipe fastened to the upper end of the tube and extending through the same, a hood inclosing the upper end of said tube and downtake-pipe, for the purpose specified, and a vent-pipe passing from the under side of the hood upward, to a point above the normal water-level in the shell or casing.

24. In a feed-water heater and purifier, the combination with the shell or casing, having a water-inlet in its upper portion and means for heating the water also in the upper portion of the shell, of a partition located below the said heating means, a filter located below the partition and spaced from the partition and from the bottom of the shell, a downtake-tube leading from the upper side of the partition through the filter, an inverted hood covering the upper end of the downtake-tube, for the purpose specified, the space between the filter and partition forming a filtered-water chamber and the space below the filter forming a settling-chamber, and a pipe leading from the filtered-water chamber outward from the shell, to withdraw the filtered water.

25. In a feed-water heater and purifier, the combination with a shell or casing having a water-inlet in its upper portion and means for heating the water also in the upper portion of the shell, of a partition located below said heating means, a filter located below the partition and spaced from the partition and from the bottom of the shell, a downtake-tube leading from the upper side of the partition downward through the filter, an inverted hood covering the upper end of the downtake-tube, for the purpose specified, the space between the filter and the partition forming a filtered-water chamber and the space below the filter forming a settling-chamber, and means for withdrawing the water from the filtered-water chamber.

26. In a feed-water heater and purifier, the combination with a shell or casing having a pipe-inlet from the upper portion thereof, and means for heating the water, also in the upper portion thereof, of a partition located below the water-inlet and heating means, to form an upper settling-chamber, a filter located below the partition and spaced from the same and from the bottom of the shell, to form a lower settling-chamber below the filter and a filtered-water chamber above the filter, means constituting a passage from the upper side of the partition downward through the filter to the lower settling-chamber, means for withdrawing the water from the filtered-water chamber, and means for the opening and closing of said passage for the water from the upper side of the partition to the lower settling-chamber.

27. The combination of a shell or casing, a filter located therein and having a settling-chamber below it and a filtered-water chamber above it, means for leading the water to the settling-chamber, the water passing upward through the filter to the filtered-water chamber, and means for withdrawing the water from the filtered-water chamber, the last-named means comprising a manifold and header and a discharge-pipe leading from the header.

28. A feed-water heater and purifier comprising a shell or casing, means for supplying steam and water to the upper part thereof, means in the lower part of the shell or casing for purifying the water, means comprising a water seal for leading the water to said purifying means, a vent in said water seal and opening into the steam-space or upper part of the shell or casing, and means for drawing off the filtered water.

29. In a feed-water heater and purifier, the combination with a shell or casing with feed-water heating and purifying devices therein, of a water-supply pipe, a valve controlling the same, a hollow float adapted to actuate the valve, and a tube extending from the lower portion of the float to the exterior of the shell or casing, said tube having an opening therein at the lower portion of the float.

30. In a feed-water heater and purifier, the combination with a shell or casing and with means for heating and purifying the water, of a water-supply pipe leading to the shell or casing, a valve commanding said supply-pipe and comprising a casing having a chamber therein, a plug controlling the water-passage through the casing, a piston connected to the plug and working in said chamber, means yieldingly holding the plug in closed position, the said casing having passages leading the water-pressure to the piston, to move the piston and plug into open position, an auxiliary valve controlling said movement of the water-pressure, and means for operating the auxiliary valve.

31. In a feed-water heater and purifier, the combination of a shell or casing having a top and a steam-inlet, an oil-collector located in the shell or casing opposite the steam-inlet, an apron within the shell or casing below the top thereof and overhanging said oil-collector, a trap constituting an overflow from the shell or casing, and a funnel under the oil-collector and over the trap and discharging into the latter.

32. The combination of a shell or casing, a vertical water-pipe passing into the same and having a plurality of openings discharging the water laterally from the pipe, and a tray having a plurality of essentially sector-shaped water-compartments respectively lying opposite the discharge-openings in the pipe to receive the water therefrom, and the tray having overflow-openings therein between the said water-compartments.

33. In a feed-water heater and purifier, the combination of a shell or casing having a settling-chamber, a filter in the shell or casing, and means located within the shell or casing and constituting a water-passage in the shell or casing leading the water to the filter from the settling-chamber, said means including a water seal.

34. A valve comprising a casing having a fluid-passage therethrough, and a chamber, a plug commanding the fluid-passage, a piston in connection with the plug and operating in the chamber, constantly-acting means tending to move the plug into closed position, the casing also having a port establishing communication between the fluid-passage and the chamber, and means for opening and closing said port whereby to admit the fluid-pressure into the chamber to actuate the piston to move the plug into open position.

35. A valve comprising a casing having a fluid-passage, and a chamber therein, a plug commanding the fluid-passage, a piston connected to the plug and operating in the chamber, means tending to move the plug into closed position, the casing also having ports leading from the fluid-passage at one side of the plug into both ends of the chamber, and an additional port leading from one end of the chamber into the fluid-passage at the opposite side of the plug, and a valve member juxtaposed to the first-named ports and movable to close communication between the fluid-passage and chamber, and to open intercommunication between the first-named ports or to close such intercommunication, and to open communication between one of the first-named ports and the fluid-passage.

36. In a feed-water heater and purifier, the combination of a shell or casing having a steam-inlet, feed-water heating and purifying means within the shell or casing, a plate mounted in the casing opposite the steam-inlet and having flanged edges, additional and relatively narrow plates mounted in front of the first-named plate, respectively at the sides of the steam-inlet, said additional plates having essentially T-shaped or double flanges at their outer edges, said plates and flanges serving to collect the oil from the steam, and means for carrying the oil so collected out from the shell or casing.

37. In a feed-water heater and purifier, the combination of a shell or casing having a steam-inlet, feed-water heating and purifying means within the shell or casing, a plate mounted in the casing opposite the steam-inlet and having flanged edges, additional and relatively narrow plates mounted in front of the first-named plate, respectively at the sides of the steam-inlet, said additional plates having essentially T-shaped or double flanges at their outer edges, said plates and flanges serving to collect the oil from the steam, means for carrying the oil so collected out from the shell or casing, and an apron mounted in the shell or casing above the steam-inlet and projecting inward and downward over the said plates.

In testimony whereof I have signed my name to this specification in the presence of two subscribing witnesses.

THOMAS OPIE ORGAN.

Witnesses:
HERMAN W. SULZER,
WM. J. WEBB.